United States Patent
Malysa et al.

(10) Patent No.: US 11,054,913 B2
(45) Date of Patent: Jul. 6, 2021

(54) HIDDEN MARKOV MODEL-BASED GESTURE RECOGNITION WITH FMCW RADAR

(71) Applicant: TEXAS INSTRUMENTS INCORPORATED, Dallas, TX (US)

(72) Inventors: Gregory Jan Malysa, Richardson, TX (US); Murtaza Ali, Cedar Park, TX (US); Dan Wang, Allen, TX (US); Lorin Paul Netsch, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/719,616

(22) Filed: Dec. 18, 2019

(65) Prior Publication Data

US 2020/0125180 A1 Apr. 23, 2020

Related U.S. Application Data

(63) Continuation of application No. 15/624,724, filed on Jun. 16, 2017, now Pat. No. 10,514,770.
(Continued)

(51) Int. Cl.
| | | |
|---|---|---|
| *G06F 3/0487* | (2013.01) | |
| *G06F 3/01* | (2006.01) | |
| *G01S 13/34* | (2006.01) | |
| *G01S 13/58* | (2006.01) | |
| *G01S 7/41* | (2006.01) | |
| *G06F 3/03* | (2006.01) | |
| *G06K 9/62* | (2006.01) | |
| *G06K 9/00* | (2006.01) | |

(Continued)

(52) U.S. Cl.
CPC ............. *G06F 3/017* (2013.01); *G01S 7/415* (2013.01); *G01S 13/34* (2013.01); *G01S 13/584* (2013.01); *G06F 3/01* (2013.01); *G06F 3/03* (2013.01); *G06F 3/0487* (2013.01); *G06K 9/00335* (2013.01); *G06K 9/6297* (2013.01); *G01S 2007/356* (2013.01); *G06N 7/005* (2013.01)

(58) Field of Classification Search
CPC .......... G06F 3/017; G06F 3/03; G06F 3/0487; G01S 13/34; G01S 13/584; G01S 7/415; G06K 9/00335
See application file for complete search history.

(56) References Cited

U.S. PATENT DOCUMENTS

| | | | |
|---|---|---|---|
| 6,011,507 A | 1/2000 | Curran et al. | |
| 7,492,303 B1 * | 2/2009 | Levitan ................... | G01S 7/024 342/188 |

(Continued)

*Primary Examiner* — Robert J Michaud
(74) *Attorney, Agent, or Firm* — Kenneth Liu; Charles A. Brill; Frank D. Cimino

(57) ABSTRACT

A system includes a frequency modulated continuous wave (FMCW) transceiver, a processor, and a memory. The memory stores program instructions that, when executed by the processor, cause the system to receive a signal representative of an FMCW signal reflected from an object of interest, apply a first Fourier transform to the signal to obtain range data, identify a subset of the range data corresponding to a region of interest, apply a second Fourier transform on the identified subset of the range data to obtain velocity data corresponding to the identified subset of the range data, and identify a gesture performed by the object of interest based on at least a portion of velocity data.

14 Claims, 2 Drawing Sheets

Related U.S. Application Data

(60) Provisional application No. 62/351,731, filed on Jun. 17, 2016.

(51) Int. Cl.
    *G01S 7/35*        (2006.01)
    *G06N 7/00*      (2006.01)

(56) References Cited

U.S. PATENT DOCUMENTS

| | | | |
|---|---|---|---|
| 10,203,763 B1* | 2/2019 | Poupyrev | G06F 3/0482 |
| 2008/0106460 A1* | 5/2008 | Kurtz | G01S 13/34 |
| | | | 342/99 |
| 2010/0245154 A1* | 9/2010 | Szajnowski | G01S 7/023 |
| | | | 342/90 |
| 2010/0305857 A1 | 12/2010 | Byrne et al. | |
| 2012/0323251 A1 | 12/2012 | De Foras et al. | |
| 2014/0092011 A1 | 4/2014 | De Foras et al. | |
| 2017/0060254 A1 | 3/2017 | Molchanov et al. | |

* cited by examiner

HIDDEN MARKOV MODEL-BASED GESTURE RECOGNITION WITH FMCW RADAR

CROSS-REFERENCE TO RELATED APPLICATIONS

This application is a continuation of U.S. patent application Ser. No. 15/624,724 filed on Jun. 16, 2017, now U.S. Pat. No. 10,514,770, which claims priority to U.S. Provisional Patent Application No. 62/351,731 filed Jun. 17, 2016.

TECHNICAL FIELD

The technical field of this invention is radar gesture recognition.

BACKGROUND

Recent work in RF-based imaging has demonstrated the capacity for real-time or near-real-time high resolution imaging using millimeter wave (mm-wave) radar. Others have focused on extracting Doppler information from lower frequency wireless signals already readily available, such as over-the-air TV transmission or in-home WIFI signals, enabling the recognition and classification of gestures. Micro-Doppler analysis has been applied to the problems of target recognition and activity classification on a larger scale at distances of up to 50 meters using mm-wave radar systems. These classification systems are typically based on a preprocessing step which extracts a feature vector and a support vector machine which classifies the feature vector by dividing the feature volume into regions corresponding to different labels.

Hidden Markov Models (HMMs) present a distinct approach to classification by assuming that the observations are related to an unobserved dynamic system process, with statistics that may change as a function of the unobservable system state. The objective, then, is to estimate the sequence of states that provides the best statistical explanation of the observed data. The use of HMMs for gesture recognition in imager video-processing based systems is widespread, but they have not yet been applied to radar-based recognition systems.

In this invention, we apply micro-Doppler analysis to measurements obtained with a Frequency Modulated Continuous Wave (FMCW) radar system operating at 77 GHz in order to perform gesture recognition and classification using a Hidden Markov Model. As shown in FIG. 1, a radar based recognition system may include an RF transmitter and receiver (102), a transmit/receive antenna (103) and a signal processing unit (101). A feature extraction algorithm is also shown that offers a significant reduction of feature vector dimension while preserving recognition performance using test data. A mm-wave radar system used for gesture detection gains all of the benefits of imaging radar, creating a significant advantage over a camera based system or one that operates passively using background signals.

SUMMARY

The radar used for gesture recognition is an FMCW system operating from 76-80 GHz. This system has a 80 μs chirp ramp time and a chirp repetition interval of 103 μs. In FMCW, a signal s(t) of the form:

$$s(t) = \exp(-j2\pi(f_c t + 0.5 K t^2))$$

is transmitted repeatedly, where $K = B/T_r$ is the total bandwidth divided by the chirp ramp time. The signal received from a point target reflector is a delayed copy of the transmitted signal and is down converted upon reception for processing. After filtering, the baseband signal is approximately:

$$b(t) = \exp\left(j\frac{4\pi}{c_0}(f_c + Kt)R(t)\right),$$

where R(t) is the time-dependent distance between the radar and the target. After conversion to the discrete time domain, the received signal b(n,m) is a function both of the sample index n within a single chirp and the chirp index m of the chirp within a larger series of chirps, called a "frame." For a point target moving with constant velocity, R(t)=R0+vt for a single frame. Therefore, this discrete time signal can be written in closed form:

$$x_m(n) = b(n, m) = \exp\left(j\frac{4\pi}{c_0}(KR_0 n T_s + f_c v m T_r)\right).$$

Under this model, the response from a scene including multiple distinct scatterers is additive. A discrete Fourier transform can be used to determine the location, in range velocity space, of each point scatterer. This model has some utility but does not adequately describe the complex response from, e.g. a human hand at short range. The response from a hand is more like a continuum of scattering centers, and during a gesture the velocity of the hand is not a singular parameter. Instead, micro-Doppler-type analysis must be used to find the distribution of energy mass in the range-velocity space corresponding to a hand.

BRIEF DESCRIPTION OF THE DRAWINGS

These and other aspects of this invention are illustrated in the drawings, in which.

DETAILED DESCRIPTION

Measurements were performed using the FMCW system described earlier. Each frame consisted of 1022 chirps, with an additional frame spacing on the order of 200 ms due to hardware limitations. Processing was broken into two components performed separately: first, the radar data was collected and processed to extract the desired feature vectors; second, the feature vectors were used to train a recognition system based on Hidden Markov Models using the publicly available HTK software package. Recognition was performed using both high dimension and reduced dimension feature vectors.

Figure 1:
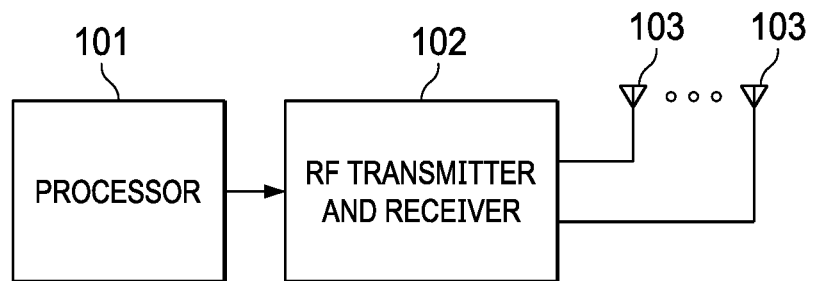
FIG. 1 is an implementation of a Frequency Modulated Continuous Wave (FMCW) radar system.
Figure 2:
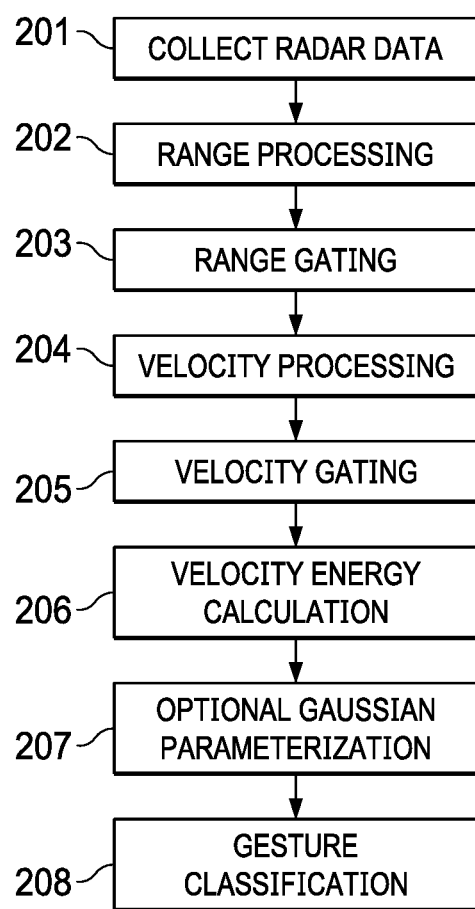
FIG. 2 is a flow chart showing steps for a gesture recognition method according to an embodiment.

In FMCW radar, both range and velocity information can be extracted and processed as part of the recognition task. This is in contrast with using a single tone Continuous Wave system only measuring the micro-Doppler spectrum, and thus is sensitive to any motion within the field of view. The main advantage is that range gating may be performed prior to the construction of the velocity-energy vectors used to create equivalent "time-velocity diagrams". This eliminates undesirable interference from other objects that may be present in the scene and allows for segmentation based on other criteria, such as a known region-of-interest where gestures may be performed. In principle, gestures could also be resolved for multiple areas simultaneously. The algorithm flow can be described as a sequence of simple steps, shown in FIG. 2.

For range processing the raw IQ data in 201 obtained from the A/D converter is processed by a simple one-dimensional fast Fourier transform (FFT) in 202 to obtain the range profile for each chirp individually.

The range FFT results are gated in 203 for a region of interest. In this implementation, the region is from 0.7 to 1.4 meters. The range-gated data is stored sequentially in a "frame buffer" until a complete frame has been acquired (1022 chirps).

Each range in the frame buffer is individually processed by a second FFT in 204 to obtain the velocity information for that range bin. The velocity FFT output is gated in 205 to velocities of ±1 m/s and stored in the "velocity buffer."

The velocity buffer's magnitude squared is integrated along the range axis for each velocity bin in 206 to obtain the final velocity-energy signature for a particular frame.

Figure 3:
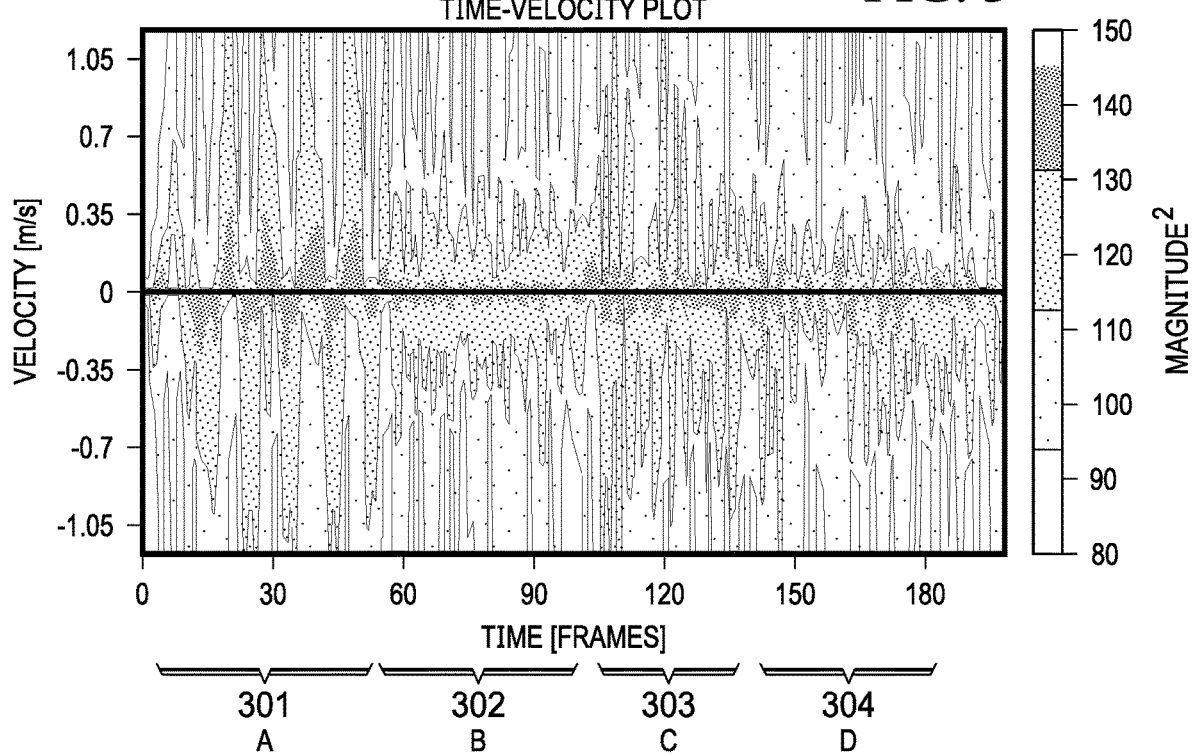
FIG. 3 is a time-velocity plot illustrating the evolution of the velocity energy during four distinct gestures. The specific gestures are described in Table 1.
Figure 4:
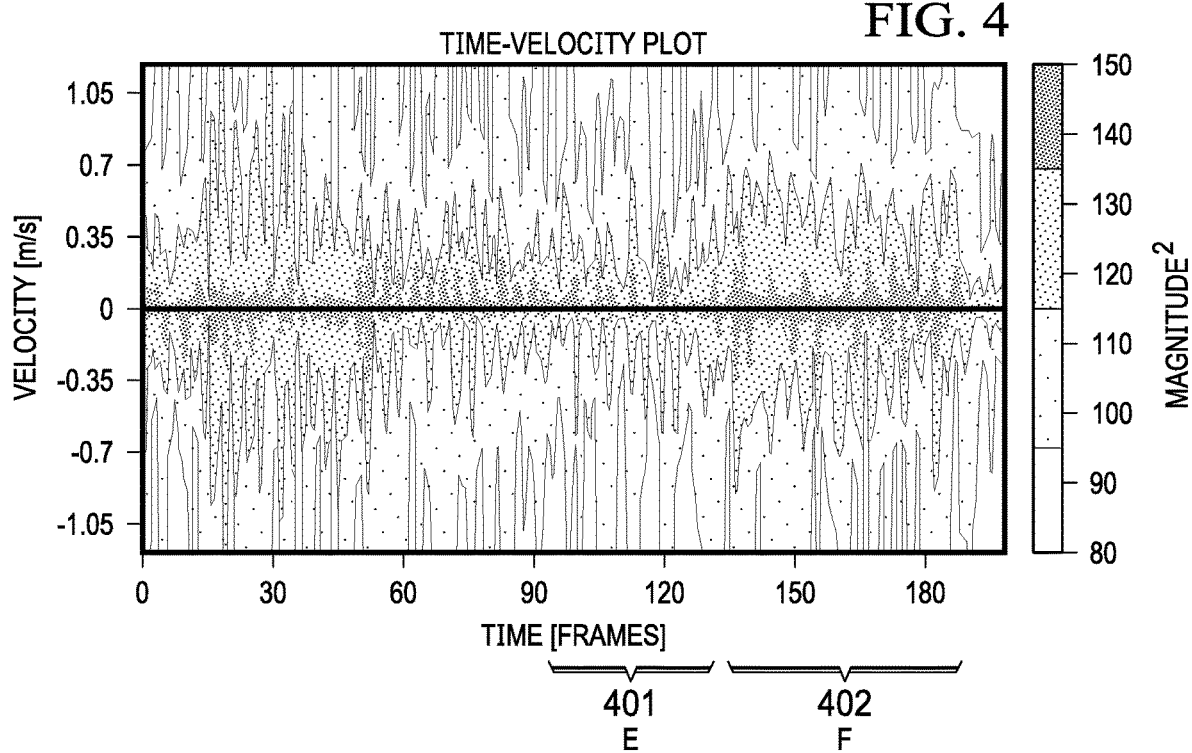
FIG. 4 is a continuation of the time-velocity plot of FIG. 3.

These velocity-energy vectors are either processed directly or passed to Gaussian parameterization step 207 before being processed in 208. They can also be visualized over time as a time-velocity diagram, which illustrates the temporal structure of various gestures. In FIGS. 3 and 4, the time-velocity diagram for six gestures is shown and annotated according to the gesture definitions in table 1.

TABLE 1

Description of gestures used in experiment

| Gesture ID | Gesture Description |
|---|---|
| A 301 | Waving the hand towards and away from the radar |
| B 302 | Rotating the hand as if grasping a doorknob, in the radial direction |
| C 303 | Twiddling the index and middle fingers back and forth rapidly |
| D 304 | Rotating the entire palm 90 degrees in the radial direction |
| E 401 | A grasping or "zoom"-like motion extending and closing all fingers |
| F 402 | Waving the hand perpendicular to the radar boresight |

Initially, all six gestures in table 1 were intended to be used for classification. However, during initial data collection we restricted the data to only four gestures, A, B, C, and E. Gestures D and F were chosen to be eliminated because of their similarity to B and A respectively. For each of the remaining four gestures, approximately 100 training sets consisting of 30 frames of continuous demonstration of the gesture were collected. Two people performed the gestures while the radar was collecting data for an extended period of time (generally several minutes at a time) and then a software program was used to automatically segment the data into 30-frame segments. The start and stop times of each segment were not aligned with any markers and the segmentation was performed automatically and without examining the data. This means it is possible that only a partial gesture was present in a very small number of frames, but the classification results suggest that this was not the case.

Each individual frame consisted of a 128-point velocity energy vector. The data was collected in an open lab space without isolation (i.e. not in an anechoic chamber). Furthermore, the radar is capable of detecting targets at a distance of up to 21 meters; this creates the potential for undesirable reflections to be captured from the ceiling and other test equipment present in the lab. However, no such out-of-range interference is present due to the range and velocity gating performed, restricting the processing only to the region-of-interest.

With the data labeled by the type of gesture being performed, it was used to train four Hidden Markov Models (HMMs) using the publicly available Hidden Markov Model Toolkit (HTK). Each HMM had five emitting states plus two non-emitting states required by HTK. After training the HMM for each gesture to convergence, the training data was re-used for the recognition task. The confusion matrix for recognition of the training set is shown in table 2 for the 30 frame configuration. Ideally, a separate test set would be used to test the recognition accuracy; however, due to the limited amount of data collected a simple test was performed to determine whether identifying characteristics for each gesture could be extracted by an HMM at all.

TABLE 2

Confusion matrix for recognition of the training set with 30 frames per gesture

| | Recognized | | | |
|---|---|---|---|---|
| True | A | B | C | E |
| A | 101 | 0 | 0 | 0 |
| B | 0 | 95 | 2 | 2 |
| C | 0 | 9 | 88 | 1 |
| E | 0 | 21 | 35 | 42 |

Table 2 illustrates that the waving gesture A, which can be seen in Table 3 to be dramatically different from all of the other gestures, is the easiest to identify, is never misidentified at the 30 frame rate, and is never incorrectly supplied as the label for a different gesture at the 30 frame rate. On the other hand, the zoom gesture E can be seen as presenting significant similarity to gestures B and C, resulting in many misclassifications. As a consequence, the aggregate accuracy of 82.3% may be misleading. A, B, and C are generally well recognized (far above the average) while E is very poorly recognized (far below the average). The summary accuracy calculations are listed in Table 3.

TABLE 3

Recognition accuracy for 30, 15, and 10 frames per gesture

| | Frame count | | |
|---|---|---|---|
| Gesture | 30 | 15 | 10 |
| A | 100% | 99.5% | 98.8% |
| B | 96.0% | 88.0% | 82.8% |
| C | 89.8% | 86.4% | 84.0% |
| E | 42.9% | 52.1% | 49.8% |
| Total | 82.3% | 81.5% | 79.0% |

After testing the performance using 30 frames per gesture, the training and recognition tasks were repeated using 15 and 10 frames per gesture, creating new segmentations of the original training data and producing up to 300 examples for each gesture in the shortest case. The recognition accuracy decreased as expected but remained sufficient for basic recognition tasks, with a 79% overall accuracy in the 10 frame per gesture case. These results are also summarized in table 3. Individual gesture accuracies follow the basic trend established in table 2 for the 30 frame case where zoom performs the worst and waving performs the best.

As mentioned in earlier, radar returns from a human hand at short range do not appear as a discrete set of points; instead, they appear as a distributed target that produces varying returns in multiple range and velocity bins. After the transformation to a velocity-energy vector, this distribution might still remain. The effects of processing, (such as windowing in our FFT) or observation (such as the point-spread function of our radar) further distribute energy from a single conceptual source into multiple observation bins. The observed velocity-energy vector may be composed of a weighted sum of L Gaussians plus some unmodeled data and noise $$f(v) = \sum_{l=1}^{L} w_l \exp\left(\frac{-(v-\mu_l)^2}{\sigma_l^2}\right). \tag{7}$$

$$E(v) = \eta(v) + f(v) \tag{8}$$

$\eta$,

Thus for a fixed small L, such as L=5, by finding $w_1$, $\mu_1$, $\sigma_1$ such that $$e^2 = (E-f)^T(E-f)$$

is minimized, we may replace the 128-point feature vector by the 15-point Gaussian parameterization vector. In the final version, the $\mu_1$ parameters were not used for classification due to extremely low sample variance, resulting in a compression ratio larger than 12 to 1.

The optimization step shown is quite sensitive to the initial guess and refinement criteria. The initial guess is provided by the peak location, magnitude, and approximate width based on neighboring local minima. This is refined using Newton refinement so long as each iteration reduces the residual energy and the weight remains positive. If either condition is not met, the previous iteration is used for that parameter triple, a new residual is calculated, and the process is repeated until L parameter triples have been extracted. This re-parameterization proved to be extremely effective for the gesture recognition task. For 30- and 15-frame gestures, the recognition accuracy improved to 83.3% and 82.4% respectively. For 10-frame gestures, the recognition accuracy decreased to 75.85%. These results suggest that the hypothesis regarding the underlying structure of the velocity-energy vector is accurate and provides a means for reducing the dimension of the feature vector by a factor of 10 or more while preserving the information required for gesture recognition.

This invention demonstrates the feasibility of short range gesture recognition using a 77-GHz FMCW radar system, using a Hidden Markov Model for classification. The radar system is capable of operating in real time and performing gesture classification for targets located within a specific area of the range-Doppler plane, eliminating energy contributed by other targets that might disrupt the gesture recognition task. A re-parameterization of the velocity-energy calculations in terms of an underlying Gaussian structure preserves most of the information required for gesture recognition while offering data size savings of more than 12×.

The invention claimed is:

1. A system comprising:
   a frequency modulated continuous wave (FMCW) transceiver;
   a processor; and
   memory to store program instructions that, when executed by the processor, cause the system to:
   receive a signal representative of an FMCW signal reflected from an object of interest;
   apply a first Fourier transform to the signal to obtain range data;
   identify a subset of the range data corresponding to a region of interest;
   apply a second Fourier transform on the identified subset of the range data to obtain velocity data corresponding to the identified subset of the range data;
   determine a velocity-energy vector by integrating a squared magnitude of each of a plurality of velocity data points from the velocity data with respect to range; and
   identify a gesture performed by the object of interest based at least partially on the velocity-energy vector.

2. The system of claim 1, wherein the program instructions, when executed by the processor, cause the system to cause the FMCW transceiver to transmit the FMCW signal toward the object of interest.

3. The system of claim 1, wherein the program instructions, when executed by the processor, cause the system to identify a subset of the velocity data that corresponds to velocities of interest, and wherein the plurality of velocity data points from the velocity data are part the identified subset of the velocity data.

4. The system of claim 1, wherein identifying the gesture performed by the object of interest based at least partially on the velocity-energy vector includes using one or more hidden Markov models.

5. The system of claim 1, wherein identifying the gesture performed by the object of interest includes using a Gaussian parameterization of the velocity-energy vector.

6. The system of claim 5, wherein the velocity-energy vector includes a first number of feature points and the Gaussian parameterization of the velocity energy vector includes a second number of feature points, the second number being less than the first number.

7. The system of claim 3, wherein the velocities of interest include a velocity range between −1 meters/second and +1 meters/second.

8. The system of claim 1, wherein the identified subset of the range data is identified by gating the range data based on the region of interest.

9. The system of claim 8, wherein the region of interest is a distance range between 0.7 and 1.4 meters.

10. The system of claim 1, wherein the FMCW transceiver operates at a frequency of between 76 and 80 gigahertz (GHz).

11. The system of claim 1, wherein the received signal includes a plurality of frames, each frame having a predetermined number of chirps.

12. The system of claim 1, wherein the first and second Fourier transforms are fast Fourier transforms (FFTs).

13. The system of claim 1, wherein the program instructions cause the processor to determine an velocity-energy vector by integrating with respect to range a squared magnitude of each of a plurality of velocity data points from the subset of the velocity data that corresponds to the velocities of interest, and wherein the identification of the gesture is based on the velocity-energy vector.

14. A system comprising:
a frequency modulated continuous wave (FMCW) transceiver;
a processor; and
memory to store program instructions that, when executed by the processor, cause the system to:
  receive a signal representative of an FMCW signal reflected from an object of interest;
  apply a first Fourier transform to the signal to obtain range data;
  identify a subset of the range data corresponding to a region of interest;
  apply a second Fourier transform on the identified subset of the range data to obtain velocity data corresponding to the identified subset of the range data;
  identify a subset of the velocity data that corresponds to velocities of interest, wherein the velocities of interest is from −1 meters/second and +1 meters/second; and
  identify a gesture performed by the object of interest based on at least a portion of the subset of the velocity data.

* * * * *